United States Patent
Arsenault (10) Patent No.: US 11,492,103 B2
(45) Date of Patent: Nov. 8, 2022

(54) DISTRIBUTED BRAKE CONTROL SYSTEMS AND METHODS FOR HIGH EFFICIENCY ANTISKID PERFORMANCE

(71) Applicant: GOODRICH CORPORATION, Charlotte, NC (US)

(72) Inventor: Tyler Arsenault, Dayton, OH (US)

(73) Assignee: Goodrich Corporation, Charlotte, NC (US)

(*) Notice: Subject to any disclaimer, the term of this patent is extended or adjusted under 35 U.S.C. 154(b) by 376 days.

(21) Appl. No.: 16/378,316

(22) Filed: Apr. 8, 2019

(65) Prior Publication Data
US 2020/0317327 A1 Oct. 8, 2020

(51) Int. Cl.
*B64C 25/46* (2006.01)
*B60T 8/17* (2006.01)
*B60T 13/68* (2006.01)
*B60T 17/22* (2006.01)

(52) U.S. Cl.
CPC ............ *B64C 25/46* (2013.01); *B60T 8/1703* (2013.01); *B60T 13/686* (2013.01); *B60T 17/221* (2013.01); *B60T 2220/00* (2013.01); *B60T 2240/00* (2013.01); *B60T 2270/88* (2013.01)

(58) Field of Classification Search
CPC ...... B60T 13/686; B60T 8/1703; B60T 8/325; B64C 25/42; B64C 25/44; B64C 25/46
See application file for complete search history.

(56) References Cited

U.S. PATENT DOCUMENTS

| 4,043,607 A | 8/1977 | Signorelli et al. |
| 6,345,225 B1* | 2/2002 | Bohm ............... B60T 8/321 180/197 |
| 8,682,559 B2* | 3/2014 | Kolbe ............... B60T 8/321 701/78 |
| 9,611,035 B2 | 4/2017 | Iordanidis et al. |
| 10,131,329 B1 | 11/2018 | Georgin et al. |
| 2003/0220731 A1* | 11/2003 | Zierolf ............ B60T 8/17616 303/121 |
| 2008/0236964 A1* | 10/2008 | Kikuchi ............ F16D 65/18 188/162 |
| 2010/0204894 A1* | 8/2010 | Strengert .......... B60T 17/221 701/70 |
| 2012/0130615 A1* | 5/2012 | Geyer ............... B60T 13/745 701/70 |
| 2015/0291280 A1 | 10/2015 | Iordanidis et al. |

(Continued)

FOREIGN PATENT DOCUMENTS

| EP | 0936115 | 8/1999 |
| EP | 2871104 | 5/2015 |

(Continued)

OTHER PUBLICATIONS

European Patent Office, European Search Report dated Jul. 27, 2020 in Application No. 19215170.2.

(Continued)

*Primary Examiner* — Bradley T King
(74) *Attorney, Agent, or Firm* — Snell & Wilmer L.L.P.

(57) ABSTRACT

A brake assembly may comprise a brake stack including a plurality of rotors and a plurality of stators. A piston assembly may be configured to apply a force to the brake stack. A brake control valve may be mounted to the piston assembly and fluidly coupled to a fluid inlet of the piston assembly.

18 Claims, 6 Drawing Sheets

(56) References Cited

U.S. PATENT DOCUMENTS

| | | | | |
|---|---|---|---|---|
| 2016/0347290 A1* | 12/2016 | Jiao | ................ | F16D 61/00 |
| 2018/0056962 A1* | 3/2018 | Kilmurray | ............ | B60T 7/042 |
| 2018/0056965 A1* | 3/2018 | Houtman | ................ | B60T 8/17 |
| 2018/0141530 A1* | 5/2018 | Kilmurray | ............ | B60T 13/662 |
| 2018/0326955 A1* | 11/2018 | Georgin | ............ | B60T 8/1703 |
| 2019/0291853 A1* | 9/2019 | Bolton | ............ | F16H 61/4148 |

FOREIGN PATENT DOCUMENTS

| | | | | |
|---|---|---|---|---|
| EP | 3184383 | | 6/2017 | |
| EP | 3187386 | | 7/2017 | |
| EP | 3225475 | | 10/2017 | |
| EP | 3225475 A1 * | 10/2017 | ............ | B60T 8/176 |
| EP | 3403892 | | 11/2018 | |

OTHER PUBLICATIONS

European Patent Office; European Office Action dated May 10, 2022 in Application No. 19215170.2.

\* cited by examiner

DISTRIBUTED BRAKE CONTROL SYSTEMS AND METHODS FOR HIGH EFFICIENCY ANTISKID PERFORMANCE

FIELD

The present disclosure relates generally to the field of brake control systems, and more specifically to systems and methods for aircraft brake control.

BACKGROUND

Aircraft typically include a braking system operatively coupled to the wheels of the aircraft and configured to slow the wheels, and the aircraft, during, for example, landing or a rejected takeoff. Aircraft braking systems tend to utilize aircraft brake controllers, to control various aspects of the braking system. For example, during a braking operation, the brake controllers may switch between a pressure controller and an antiskid controller. In this regard, as a pilot applies force to the brake pedals, the pressure or force applied at the brake is increased to decelerate the wheel and aircraft. As the pressure/force exceeds the braking condition supported by the tire/runway friction, the antiskid controller may become dominant, such that the antiskid controller controls the brake pressure/braking force to prevent or reduce skidding.

Aircraft brake systems typically employ a series of friction disks compressed together to stop the aircraft. Some aircraft brake systems adjust the compression of the friction disks by controlling a valve configured to control brake actuators that apply force to the friction disks. The valve may be located away from the brake actuators in the fuselage or gearing of the aircraft. The fluid distance between the valve and the brake actuators may comprise a relatively long and tortuous path through which fluid flows to affect braking pressure. The long and tortuous path may lead to system and mechanical losses.

SUMMARY

A brake assembly is disclosed herein. In accordance with various embodiments, the brake assembly may comprise a brake stack including a plurality of rotors and a plurality of stators, and a piston assembly configured to apply a force to the brake stack. The piston assembly may comprise a fluid inlet. A brake control valve may be mounted to the piston assembly and fluidly coupled to the fluid inlet of the piston assembly. A controller may be electrically coupled to the brake control valve. The controller may be mounted to at least one of the piston assembly or the brake control valve.

In various embodiments, the brake control valve may comprise an electrohydraulic servo valve. In various embodiments, the piston assembly may comprise a piston housing and a hydraulic piston located within the piston housing. The brake control valve may be mounted to the piston housing.

In various embodiments, a pressure sensor may be configured to measure a hydraulic pressure of the piston assembly. A wheel speed sensor may be electrically coupled to the controller.

In various embodiments, a tangible, non-transitory memory may be configured to communicate with the controller. The tangible, non-transitory memory has instructions stored thereon that, in response to execution by the controller, cause the controller to perform operations which may comprise: receiving, by the controller, a pressure command; and outputting, by the controller, a valve command to the brake control valve.

In various embodiments, the controller may comprises a pressure control module configured to receive a pressure signal from the pressure sensor, an antiskid control module configured to receive a wheel speed signal, and a pressure-antiskid logic configured to output the valve command.

In various embodiments, the controller may be mounted to the brake control valve, and the brake control valve and the controller may comprise a line replaceable unit.

A brake system for an aircraft landing gear is also disclosed herein. In accordance with various embodiments, the brake system may comprise a master brake control unit and a brake assembly operationally coupled to the master brake control unit. The brake assembly may comprise a brake stack including a plurality of rotors and a plurality of stators and a piston assembly configured to apply a force to the brake stack and comprising a fluid inlet. A brake control valve may be mounted to the piston assembly and fluidly coupled to the fluid inlet of the piston assembly. A secondary controller may be electrically coupled to the master brake control unit and to the brake control valve.

In various embodiments, the piston assembly may comprise a piston housing and a hydraulic piston located within the piston housing. The brake control valve may be mounted to the piston housing. In various embodiments, the secondary controller may be mounted to the piston housing. In various embodiments, the secondary controller may be mounted to the brake control valve.

In various embodiments, the brake control valve may comprise an electrohydraulic servo valve. In various embodiments, the brake assembly may further comprise a pressure sensor electrically coupled to the secondary controller and configured to measure a hydraulic pressure of the piston assembly, and a wheel speed sensor electrically coupled to the secondary controller.

In various embodiments, a first tangible, non-transitory memory may be configured to communicate with the master brake control unit. The first tangible, non-transitory memory has master controller instructions stored thereon that, in response to execution by the master brake control unit, cause the master brake control unit to perform master controller operations which may comprise: receiving, by the master brake control unit, a pilot pressure command; and outputting, by the master brake control unit, a pressure command to the secondary controller based on the pilot pressure command.

In various embodiments, the brake assembly may further comprise a second tangible, non-transitory memory configured to communicate with the secondary controller. The second tangible, non-transitory memory has secondary controller instructions stored thereon that, in response to execution by the secondary controller, cause the secondary controller to perform secondary controller operations which may comprise: receiving, by the secondary controller, the pressure command; and outputting, by the secondary controller, a valve command to the brake control valve based on the pressure command.

A method of controlling a brake system is also disclosed herein. In accordance with various embodiments, the method may comprise: receiving, by a secondary controller, a pressure command from a master brake control unit; and outputting, by the secondary controller, a valve command to a brake control valve of the brake system. The brake control valve may be mounted to a piston assembly of the brake system.

In various embodiments, brake control valve may be an electrohydraulic servo valve. In various embodiments, the secondary controller may be mounted to the brake control valve.

In various embodiments, outputting the valve command may comprises: receiving, by the secondary controller, a pressure signal from a pressure sensor; determining, by the secondary controller, a pressure control valve command based on the pressure command from the master brake control unit and the pressure signal from the pressure sensor; and outputting, by the secondary controller, the pressure control valve command to a pressure-antiskid logic of the secondary controller.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for controlling brake pressure. In accordance with various embodiments, a brake control valve, (e.g., an EHSV) may be located on the brake actuator housing. Locating the brake control valve on the brake actuator housing may increase brake performance and mitigate performance losses due to the decreased line length between the brake control valve and the brake actuators. In various embodiments, a local controller may be coupled to each brake control valve. The local controllers may be in communication with a main brake control unit (BCU). The local controllers may allow for more comprehensive testing and/or sensing to be built in at the wheel level. Additionally, the local controllers and brake control valves may be modular units (e.g., line replaceable units (LRUs)) that can be readily tested, removed/disconnected, and/or replaced without having to remove the BCU, the brake assembly, or the other local controllers and brake control valves from the system.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

Figure 1:
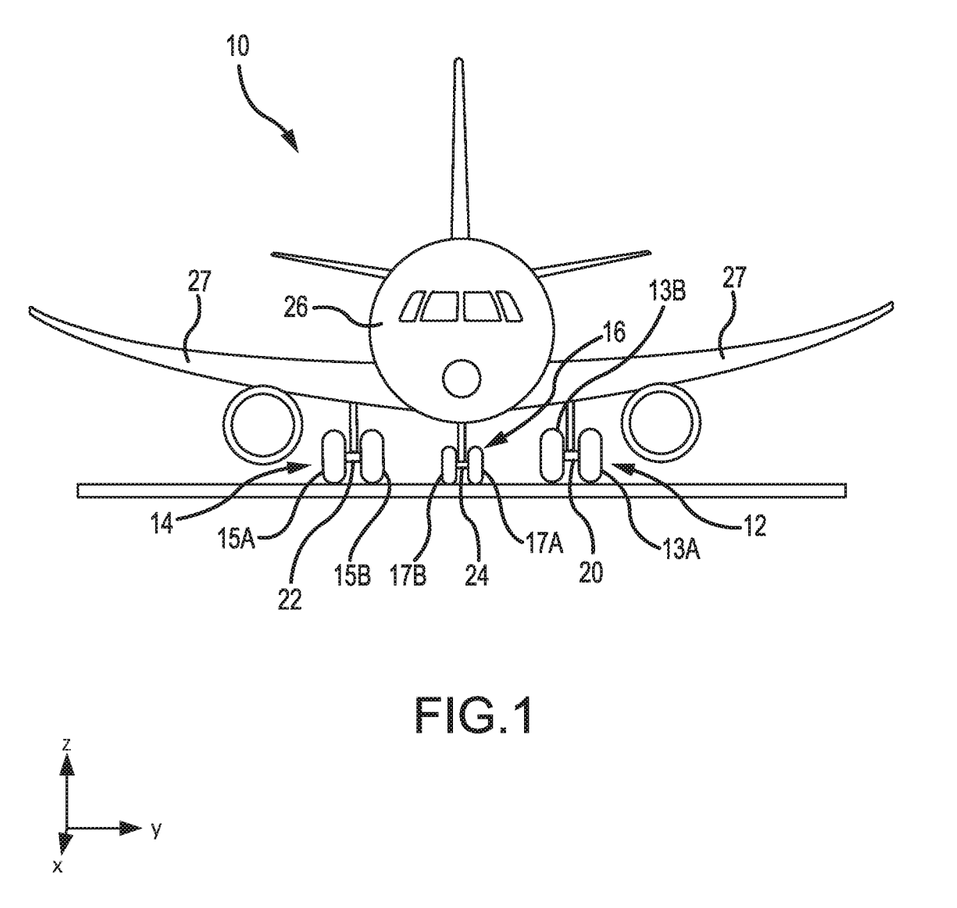
FIG. 1 illustrates an aircraft, in accordance with various embodiments.

With reference to FIG. 1, an aircraft 10 is illustrated, in accordance with various embodiments. Aircraft 10 may include landing gear such as left landing gear 12, right landing gear 14, and nose landing gear 16. Left landing gear 12, right landing gear 14, and nose landing gear 16 may generally support aircraft 10 when aircraft 10 is not flying, allowing aircraft 10 to taxi, take off, and land without damage. Left landing gear 12 may include left outboard (LOB) wheel 13A and left inboard (LIB) wheel 13B coupled by an axle 20. Right landing gear 14 may include right outboard (ROB) wheel 15A and right inboard (RIB) wheel 15B coupled by an axle 22. Nose landing gear 16 may include left nose wheel 17A and right nose wheel 17B coupled by an axle 24. The nose wheels may differ from the left and right landing gear wheels in that the nose wheels may not include a brake. An XYZ axes is used throughout the drawings to illustrate the axial (y), forward (x) and vertical (z) directions relative to axle 22.

Figure 2:
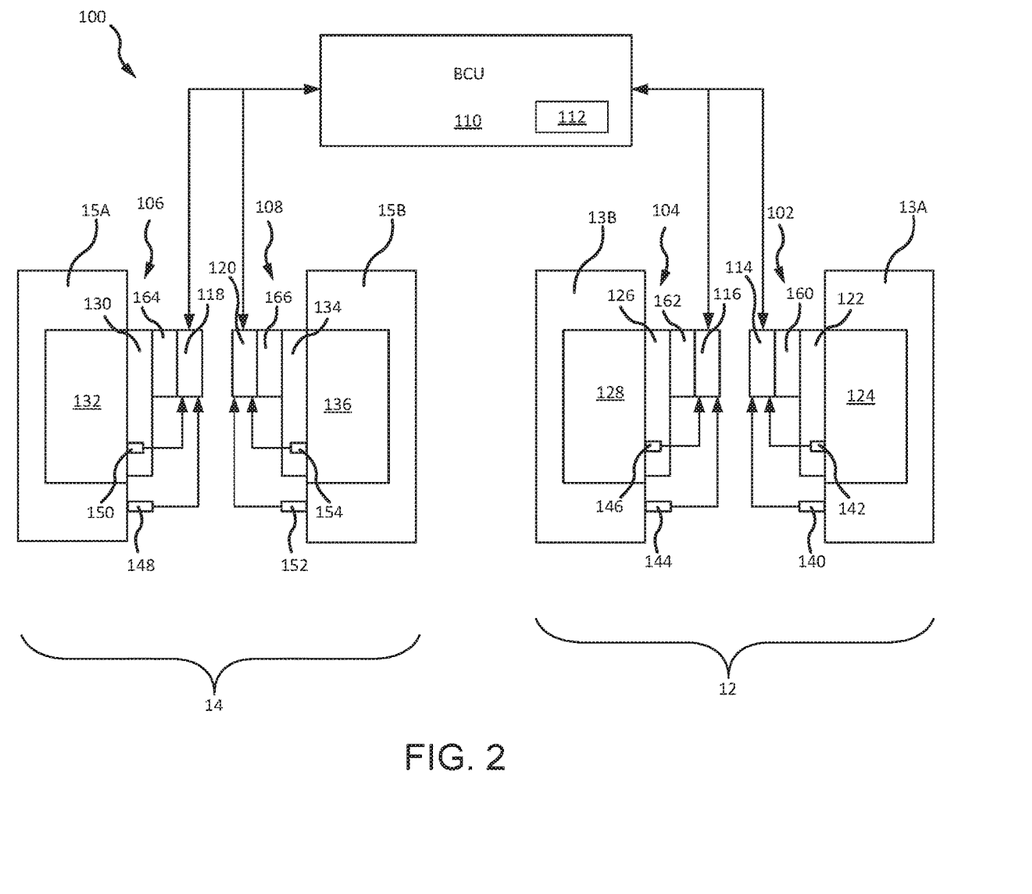
FIG. 2 illustrates a brake system, in accordance with various embodiments.

With reference to FIG. 2, a brake system 100 is shown, in accordance with various embodiments. In various embodiments, brake system 100 may be configured to control braking of left landing gear 12 and right landing 14. Brake system 100 may include a LOB brake assembly 102 coupled to LOB wheel 13A, a LIB brake assembly 104 coupled to LIB wheel 13B, a ROB brake assembly 106 coupled to ROB wheel 15A, and a RIB brake assembly 108 coupled to RIB wheel 15B. Brake assemblies 102, 104, 106, 108 are configured to apply and release braking force on their respective wheels. While FIG. 2 illustrates brake system 100 comprising two landing gears (i.e., left landing gear 12 and right landing gear 14) with four total wheels, it is further contemplated and understood that the brake systems and methods described herein may apply to brake systems comprising any number of landing gears and/or number of wheels per landing gear.

Brake system 100 includes a master brake control unit 110 (referred to herein as BCU 110). BCU 110 may be configured to control braking of left landing gear 12 and right landing gear 14. For example, BCU 110 may be operationally coupled to brake assemblies 102, 104, 106, 108. In this regard, BCU 110 may be configured to send brake pressure commands (i.e., signals corresponding a desired brake pressure) to each of brake assemblies 102, 104, 106, 108. In accordance with various embodiments, BCU 110 may include and communicate with one or more processors and one or more tangible, non-transitory memories 112 and may be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

Brake assemblies 102, 104, 106, 108 may each include a local (or secondary) controller, for example, LOB brake assembly 102 includes LOB controller 114, LIB brake assembly 104 includes LIB controller 116, ROB brake assembly 106 includes ROB controller 118, and RIB brake assembly 108 includes RIB controller 120 (referred to herein collectively as secondary controllers 114, 116, 118, and 120). In accordance with various embodiments, secondary controllers 114, 116, 118, and 120 may each include and communicate with one or more processor(s) and one or more tangible, non-transitory memories and may be capable of implementing logic. The processor can be a general purpose processor, a DSP, an ASIC, a FPGA or other programmable logic device, discrete gate or transistor logic, discrete hardware components, or a combination thereof.

Secondary controllers 114, 116, 118, and 120 are in electronic communication with BCU 110. In various embodiments, secondary controllers 114, 116, 118, and 120 are configured to send digital signals to and receive digital signals from BCU 110. Secondary controllers 114, 116, 118, and 120 may receive brake pressure commands from BCU 110 and may send signals corresponding to the operating characteristics (e.g., braking pressure, wheel speed, antiskid engagement, etc.) of wheels 13A, 13B, 15A, 15B, respectively, to BCU 110. BCU 110 may operate to receive information from secondary controllers 114, 116, 118, and 120 and determine a performance of brake assemblies 102, 104, 106, 108. For example, BCU 110 may be configured to determine and compare expected wheel speeds and/or expected wheel deceleration rates to actual wheel speeds and/or actual wheel deceleration rates using information received from secondary controllers 114, 116, 118, and 120. BCU 110 may determine and compare an expected aircraft deceleration rate to an actual deceleration rate of aircraft 10 using information received from secondary controllers 114, 116, 118, and 120. BCU 110 may use the information received from secondary controllers 114, 116, 118, and 120 along with brake command signals received from the cockpit (e.g. pilot brake commands) to determine a pressure command signal to be output to secondary controllers 114, 116, 118, and 120.

Brake assemblies 102, 104, 106, 108 may each comprise a piston assembly configured to apply pressure to a brake stack of the brake assembly. In this regard, LOB brake assembly 102 may include a LOB piston assembly 122 and a LOB brake stack 124; LIB brake assembly 104 may include a LIB piston assembly 126 and a LIB brake stack 128; ROB brake assembly 106 may include a ROB piston assembly 130 and a ROB brake stack 132; and RIB brake assembly 108 may include a RIB piston assembly 134 and a RIB brake stack 136.

Brake assemblies 102, 104, 106, 108 may each comprise a plurality of sensors. For example, in various embodiments, brake assemblies 102, 104, 106, 108 may each include a pressure sensor for detecting a braking pressure being applied by the respective piston assembly, and a wheel speed sensor for detecting a rotational velocity of the respective wheel. In this regard, LOB brake assembly 102 may include a LOB wheel speed sensor 140 and a LOB pressure sensor 142; LIB brake assembly 104 may include a LIB wheel speed sensor 144 and a LIB pressure sensor 146; ROB brake assembly 106 may include a ROB wheel speed sensor 148 and a ROB pressure sensor 150; RIB brake assembly 108 may include a RIB wheel speed sensor 152 and a RIB pressure sensor 154. Pressure sensors 142, 146, 150, 154 may detect a braking pressure applied to brake stacks 124, 128, 132, 136, respectively. For example, pressure sensors 142, 146, 150, 154 may measure a hydraulic pressure of one or more hydraulic pistons within piston assemblies 122, 126, 130, 134, respectively.

Wheel speed sensors 140, 144, 148, 152 may be coupled to each respective wheel to measure one or more wheel speed characteristic(s) of the wheel. The wheel speed characteristic(s) may comprise a velocity, acceleration, and/or deceleration of the wheel. The wheel speed characteristics may be measured in terms of linear or angular position, linear or angular velocity, linear or angular acceleration, or other measurement unit. Wheel speed sensors 140, 144, 148, 152 may output signals indicative of angular velocity or angular displacement, for example, wheel speed sensors 140, 144, 148, 152 may comprise Hall effect sensors, variable resistance sensors, accelerometers or the like. The data output from pressure sensors 142, 146, 150, 154 and wheel speed sensors 140, 144, 148, 152 may be sent to secondary controllers 114, 116, 118, 120, respectively. Secondary controllers 114, 116, 118, 120 may use data output from pressure sensors 142, 146, 150, 154 and wheel speed sensors 140, 144, 148, 152 to calculate or estimate a rotational velocity, acceleration, and/or deceleration of each wheel.

In accordance with various embodiments, each of the secondary controllers 114, 116, 118, 120 is in electrical communication with a brake control valve (e.g., with an EHSV) coupled to its respective piston assembly. In this regard, LOB controller 114 is electrically coupled to a LOB brake control valve 160. LOB brake control valve 160 may be mounted or otherwise attached to LOB piston assembly 122. LIB controller 116 is electrically coupled to a LIB brake control valve 162. LIB brake control valve 162 may be mounted or otherwise attached to LIB piston assembly 126. ROB controller 118 is electrically coupled to a ROB brake control valve 164. ROB brake control valve 164 may be mounted or otherwise attached to ROB piston assembly 130. RIB controller 120 is electrically coupled to a RIB brake control valve 166. RIB brake control valve 166 may be mounted or otherwise attached to RIB piston assembly 134. Brake control valves 160, 162, 164, 166 are configured to control a flow of hydraulic fluid to piston assemblies 122, 126, 130, 134, respectively. Brake control valves 160, 162, 164, 166 may thus control the hydraulic pressure within piston assemblies 122, 126, 130, 134.

Figure 3:
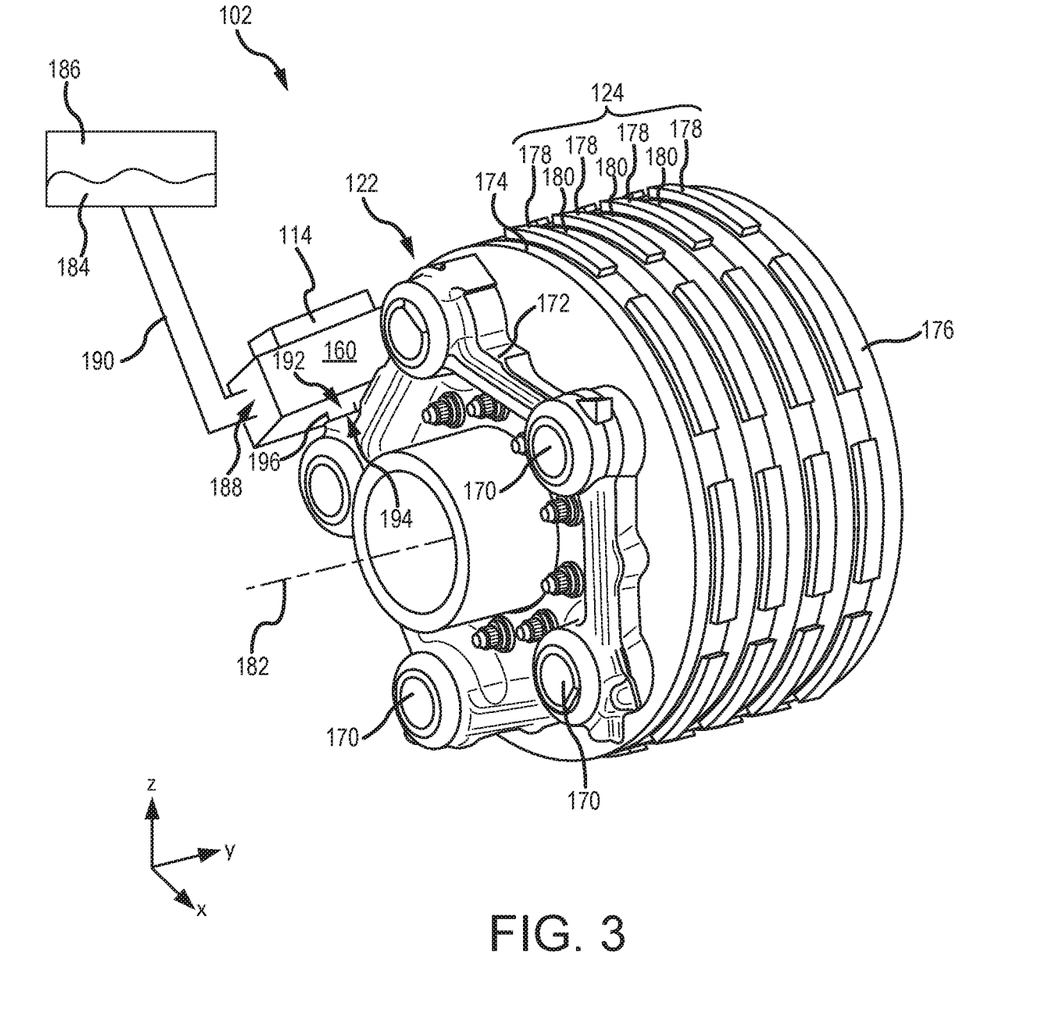
FIG. 3 illustrates an aircraft brake, in accordance with various embodiments.

FIG. 3 illustrates LOB brake assembly 102, in accordance with various embodiments. While FIG. 3 illustrates LOB brake assembly 102, it should be understood that LIB brake assembly 104, ROB brake assembly 106, and RIB brake assembly 108 with momentary reference to FIG. 2, brake system 100 include the elements and functionalities as described herein with respect LOB brake assembly 102.

LOB brake assembly 102 includes LOB piston assembly 122 and LOB brake stack 124. LOB piston assembly 122 includes one or more pistons 170 and a piston housing 172. Pistons 170 may be mounted to piston housing 172. LOB brake assembly 102 includes a pressure plate 174, an end plate 176, and a plurality of rotating discs, or rotors, 178 and non-rotating disks, or stators 180 (collectively referred to herein as LOB brake stack 124) positioned in an alternating fashion between end plate 176 and pressure plate 174. Rotors 178 may rotate about an axis 182 and stators 180 may have little to no angular movement relative to axis 182. A wheel (such as LOB wheel 13A with brief reference to FIG. 2) may be coupled to rotors 178 such that a linear speed of the aircraft is proportional to the angular speed of rotors 178. As force is applied to pressure plate 174 in a direction towards end plate 176 along axis 182, rotors 178 and stators 180 are forced together in an axial direction. This causes the rotational speed of rotors 178 to decrease (i.e., causes braking effect) due to friction between rotors 178, stators 180, end plate 176, and pressure plate 174.

In accordance with various embodiments, pistons 170 may be hydraulic pistons, also referred to as hydraulic cylinders or hydraulic actuators. In this regard, changes in the hydraulic pressure within pistons 170 may cause actuation of pistons 170. For example, an increase in hydraulic pressure results in an actuation of pistons 170 towards pressure plate 174, thereby increasing the force exerted on pressure plate 174. A decrease in hydraulic pressure results in an actuation of pistons 170 away from pressure plate 174, thereby decreasing the force exerted on pressure plate 174.

In accordance with various embodiments, the hydraulic pressure within pistons 170 may be controlled by LOB brake control valve 160. In various embodiments, LOB brake control valve 160 is an EHSV. LOB brake control valve 160 is configured to control the flow of hydraulic fluid (e.g., oil) 124 to pistons 170. LOB brake control valve 160 receives hydraulic fluid 184 from a hydraulic fluid source 186. In various embodiments, hydraulic fluid source 186 is located in the fuselage 26 and/or in wings 27 of aircraft 10, with momentary reference to FIG. 1. Hydraulic fluid source 186 is fluidly coupled to an inlet 188 of LOB brake control valve 160 via a conduit 190. LOB piston assembly 122 is fluidly coupled to an outlet 192 of LOB brake control valve 160. In this regard, a fluid inlet 194 of LOB piston assembly 122 is fluidly coupled to outlet 192 of LOB brake control valve 160 via a conduit 196. To increase a hydraulic pressure of pistons 170, hydraulic fluid 184 from hydraulic fluid source 186 flows into LOB brake control valve 160 through inlet 188 and into LOB piston assembly 122 through outlet 192 and fluid inlet 194. To decrease the hydraulic pressure of pistons 170, hydraulic fluid 184 from LOB piston assembly 122 flows into LOB brake control valve 160 through outlet 192 and to hydraulic fluid source 186 through inlet 188. In various embodiments, piston housing 172 may include piping (i.e., a one more conduits) fluidly coupling each of the pistons 170 to fluid inlet 194 such that a single LOB brake control valve 160 may control the hydraulic pressure within each of the pistons 170.

LOB brake control valve 160 is mounted or otherwise attached to LOB piston assembly 122. In various embodiments, LOB brake control valve 160 may be mounted to piston housing 172. Mounting LOB brake control valve 160 to LOB piston assembly 122 decreases the distance between outlet 192 of LOB brake control valve 160 and fluid inlet 194 of LOB piston assembly 122, as compared to conventional brake systems, wherein the brake control valve is typically located with fuselage 26 or wings 27, with momentary reference to FIG. 1. The decreased distance between LOB brake control valve 160 and LOB piston assembly 122 may decrease response time and increase brake performance.

LOB controller 114 may be mounted or otherwise attached to LOB brake control valve 160. In various embodiments, LOB controller 114 may be mounted or otherwise attached to LOB piston assembly 122. For example, LOB brake controller 114 may be mounted to piston housing 172. LOB controller 114 and LOB brake control valve 160 comprise modular units (e.g., a line replaceable unit (LRU)) that are discrete from the other components of brake system 100. In this regard, LOB controller 114 and LOB brake control valve 160 can be readily tested, removed or disconnected, and/or replaced without having to remove BCU 110, LOB piston assembly 122, and/or the other local controllers and brake control valves from brake system 100.

LOB brake control valve 160 is configured to receive an electrical signal (i.e., a valve command) from LOB controller 114. LOB brake control valve 160 adjusts the flow of hydraulic fluid to LOB piston assembly 122 in accordance with the electrical signal received from LOB controller 114. For example, LOB brake control valve 160 transfers hydraulic fluid 184 to pistons 170 at a pressure that is proportional to the electrical signal received from LOB controller 114.

While FIG. 3 shows one LOB brake control valve 160 fluidly coupled to pistons 170, it is further contemplated and understand that LOB brake assembly 102 may include more than one LOB brake control valve 160 with any number of pistons 170 fluidly coupled to each LOB brake control valve 160. For example, LOB brake assembly 102 may comprise two LOB brake control valves 160 and six pistons 170, with three of the pistons fluidly coupled to one LOB brake control valve and the other three pistons fluidly coupled to the other brake control valve. In various embodiments, each piston 170 may have a dedicated LOB brake control valve 160.

Figure 4:
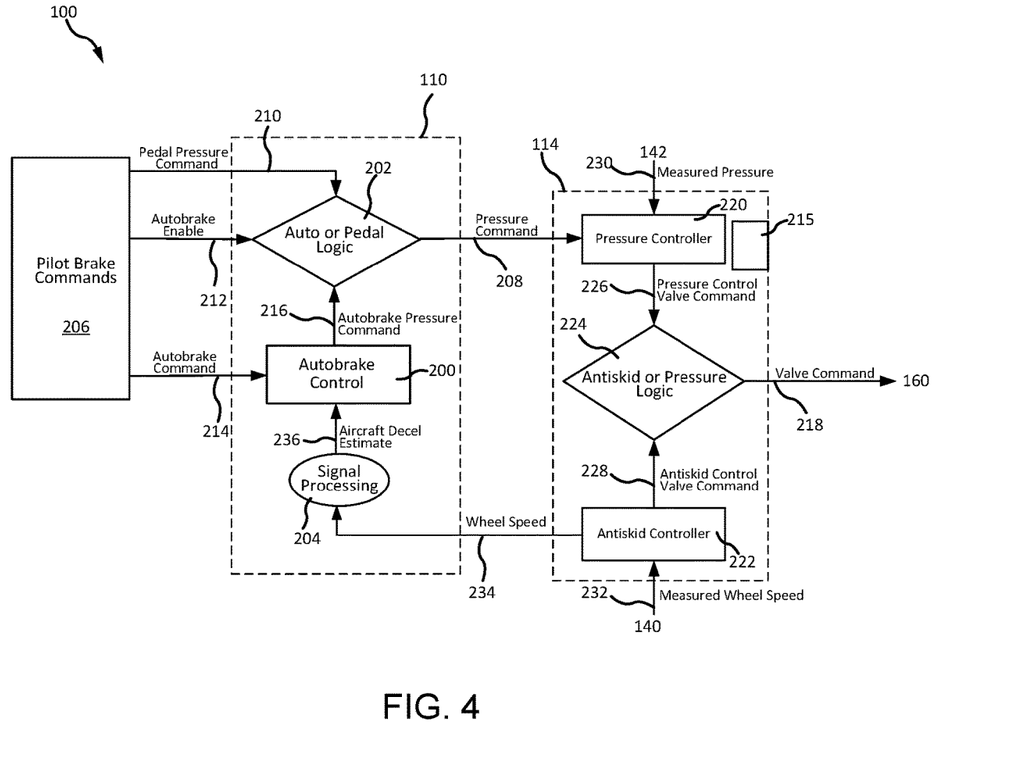
FIG. 4 illustrates a schematic block diagram of a brake system, in accordance with various embodiments.

In FIG. 4, a schematic block diagram showing additional details of brake system 100 is illustrated, in accordance with various embodiments. While FIG. 4 illustrates elements and functionalities of LOB controller 114 and LOB brake assembly 102, it should be understood that LIB controller 116 and LIB brake assembly 104, ROB controller 118 and ROB brake assembly 106, and RIB controller 120 and RIB brake assembly 108, with momentary reference to FIG. 2, include the elements and functionalities as described herein with respect LOB controller 114 and LOB brake assembly 102.

In various embodiments, BCU 110 may comprise various brake control modules such as autobrake control 200, brake control executive logic 202, signal processing unit 204, etc. for controlling brake assemblies 102, 104, 106, 108, with momentary reference to FIG. 2, of brake system 100. BCU 110 may be configured receive pilot brake commands 206 and, in response to the pilot brake commands 206, issue a pressure command 208. BCU 110 may be configured to send pressure command to LOB controller 114. In various embodiments, pilot brake commands 206 may be issued from the cockpit and may include a pedal pressure command 210, an autobrake enabled signal 212, and an autobrake command 214. In various embodiments, brake control executive logic 202 may determine if pressure command 208 should coincide with an autobrake pressure command 216 output from autobrake control 200 or with pedal pressure command 210. For example, if autobrake enabled signal 212 indicates the pilot has turned on the autobrake function, brake control executive logic 202 uses autobrake pressure command 216 for pressure command 208. If autobrake enabled signal 212 indicates the autobrake function is off, brake control executive logic 202 uses pedal pressure command 210 for pressure command 208.

In accordance with various embodiments, autobrake control 200 may comprise an automatic braking system, which may be enabled from the cockpit during takeoff and landing. The autobrake system is configured to control the longitudinal deceleration of aircraft 10 with minimal pilot input. The autobrake system may be programmed to determine and/or to set a target aircraft deceleration rate. The selection of a deceleration setting (e.g., a low deceleration or a max deceleration) may be done on the aircraft instrument panel. Autobrake command 214 may provide a target or reference aircraft deceleration rate and may be based on the deceleration setting selected by the pilot. When autobrake is enabled, BCU 110 sends brake commands configured to decelerate the aircraft decelerate at a rate based on the autobrake deceleration setting, as opposed to at a rate corresponding to the pressure applied to the brake pedal by the pilot.

In accordance with various embodiments, LOB controller 114 is configured to receive pressure command 208 from BCU 110 and issue a valve command 218. LOB controller 114 is configured to send valve command 218 to LOB brake control valve 160. LOB controller 114 includes and communicates with one or more processor(s) and one or more tangible, non-transitory memories 215 and may be capable of implementing logic. The processor can be a general purpose processor, a DSP, an ASIC, a FPGA or other programmable logic device, discrete gate or transistor logic, discrete hardware components, or a combination thereof.

LOB controller 114 may comprise various brake control modules, such as pressure control module 220, an antiskid control module 222, a pressure-antiskid logic 224, etc., for controlling LOB brake assembly 102. Pressure-antiskid logic 224 may be configured to determine if a pressure control valve command 226 issued from pressure control module 220 or if an antiskid control valve command 228 issued from antiskid control module 222 should be output as valve command 218. In this regard, during a braking operation, pressure-antiskid logic 224 may switch between pressure control module 220 being dominant and antiskid control module 222 being dominant. In various embodiments, pressure control module 220 receives pressure command 208 from BCU 110 and pressure signals 230 from LOB pressure sensor 142, and outputs a pressure control valve command 226 based on pressure command 208 and pressure signals 230. During a normal braking (i.e., a non-skid event), pressure-antiskid logic 224 may determine to output pressure control valve command 226 as valve command 218. LOB brake control valve 160 receives valve command 218 and adjusts (e.g., increases) the hydraulic pressure of LOB piston assembly 122 in accordance with the valve command 218 (i.e., in accordance with pressure control valve command 226).

Antiskid control module 222 may receive wheel speed signals 232 from LOB wheel speed sensor 140, and output an antiskid control valve command 228 based on wheel speed signals 232. If a skid event is identified (e.g., based on wheel speed signals 232 and/or pressure signals 230), antiskid control module 222 may become dominant such that pressure-antiskid logic 224 outputs antiskid control valve command 228 as valve command 218. LOB brake control valve 160 then receives valve command 218 and adjusts (e.g., decreases) the hydraulic pressure of LOB piston assembly 122 in accordance with the valve command 218 (i.e., in accordance with antiskid control valve command 228). In various embodiments, pressure-antiskid logic 224 may be included in pressure control module 220. In this regard, antiskid control valve command 228 may be received by pressure control module 220 and the pressure-antiskid logic 224 within pressure control module 220 may determine pressure control valve command 226 using pressure command 208, pressure signals 230, and antiskid control valve command 228; pressure control valve command 226 may then be output (as valve command 218) to LOB brake control valve 160.

LOB controller 114 may be configured to send wheel speed data 234 to BCU 110. BCU 110 may calculate an estimated aircraft deceleration rate 236 using wheel speed data 234. BCU 110 may calculate pressure command 208 based on the estimated aircraft deceleration rate 236 and pilot brake commands 206. Stated differently, BCU 110 may calculate pressure command 208 using wheel speed data 234 and pilot brake commands 206. BCU 110 may also use wheel speed data 234 to monitor the health of LOB brake assembly 102. For example, BCU 110 may compare wheel speed data 234 from LOB brake assembly 102 to the wheel speed data output from the other secondary controllers (i.e., from LIB controller 116, ROB controller 118, and RIB controller 120). BCU 110 may also determine if an actual (or measured) aircraft deceleration rate coincides with wheel speed data 234 and estimated aircraft deceleration rate 236.

In various embodiments, the pressure signals 230 and wheel speed signals 232 may be analog signals, and pressure command 208 and wheel speed data 234 may be digital signals. In this regard, LOB controller 114 may include one or more DC/AC converter and one or more AC/DC converters. Locating LOB controller 114 on LOB brake assembly 102 may allow for more comprehensive testing and/or sensing to be built in to LOB wheel 13A, as a length, and thus a weight, of the wiring between the sensors and LOB controller 114 is reduced by locating the secondary controllers closer to the sensors.

Figure 5A:
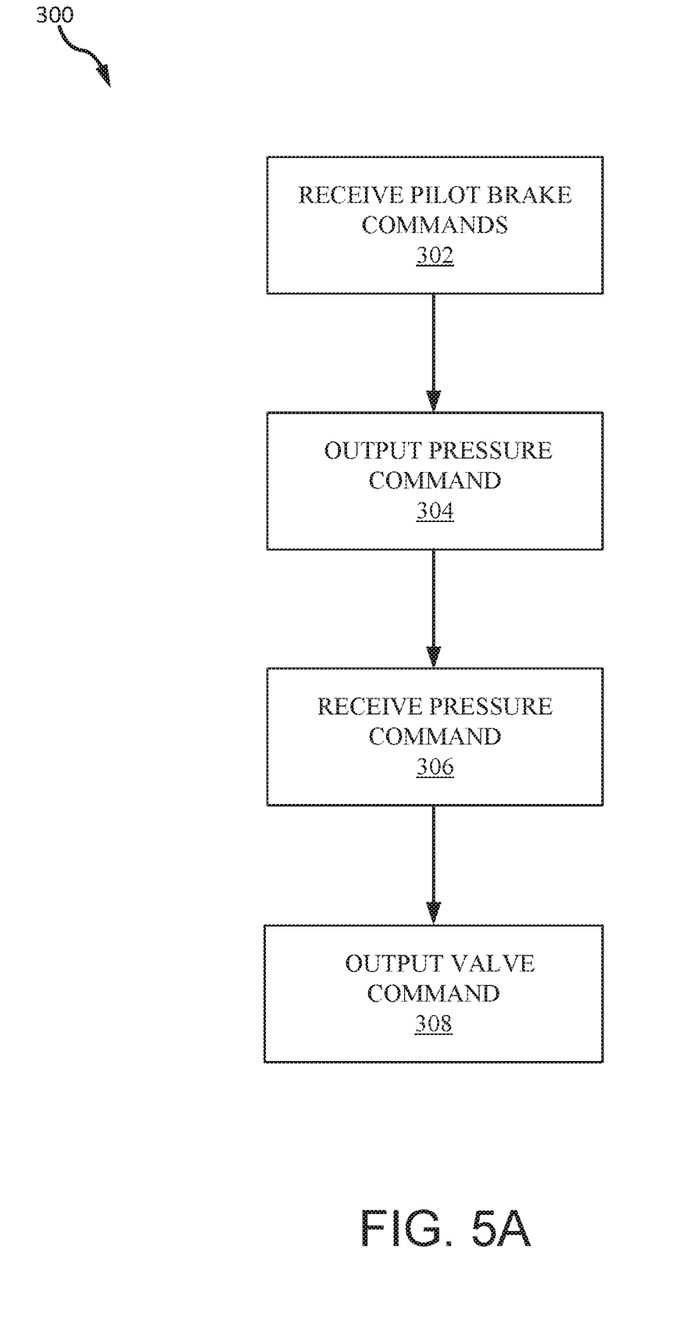
FIGS. 5A and 5B illustrate a method of controlling a brake system, in accordance with various embodiments.

With reference to FIG. 5A, a method 300 for controlling a brake system is shown, in accordance with various embodiments. With combined reference to FIG. 5A and FIG. 4, method 300 may include receiving, by BCU 110, pilot brake commands 206 (step 302) and outputting, by BCU 110, pressure command 208 based on the pilot brake commands (step 304). Method 300 may further comprise receiving, by a secondary controller (e.g., LOB controller 114), pressure command 208 (step 306) and outputting, by the secondary controller, valve command 218 to a brake control valve (e.g., LOB brake control valve 160) (step 308).

Figure 5B:
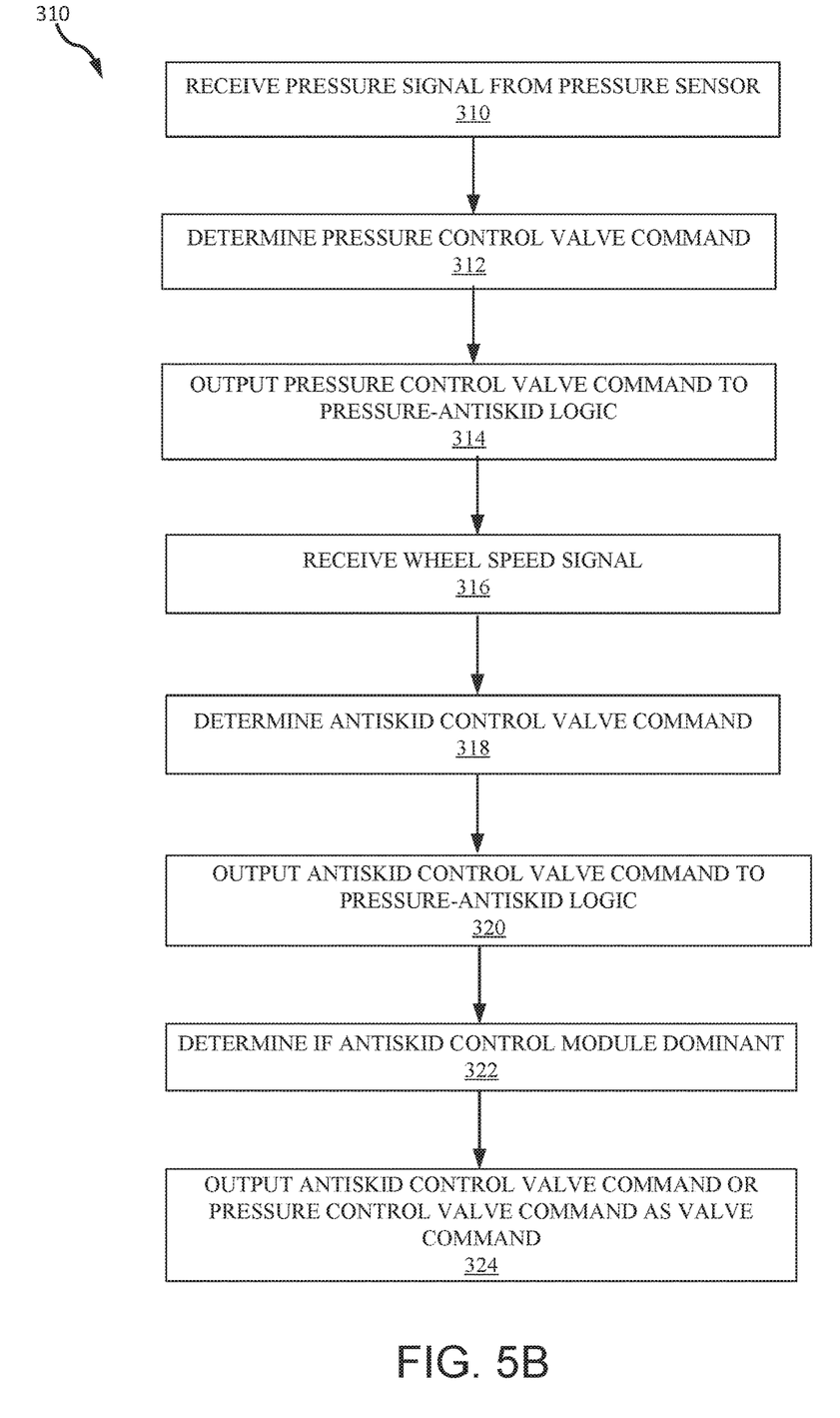

With combined reference to FIG. 5B and FIG. 4, in various embodiments, step 308 may include receiving, by pressure control module 220, pressure signal 230 from a pressure sensor (e.g., LOB pressure sensor 142) (step 310), determining, by pressure control module 220, pressure control valve command 226 based on pressure command 208 from master brake control unit 110 and pressure signal 230 (step 312), and outputting, by pressure control module 220, pressure control valve command 226 to pressure-antiskid logic 224 of the secondary controller (step 314).

Step 308 may further include receiving, by antiskid control module 222, wheel speed signal 232 from a wheel speed sensor (e.g., LOB wheel speed sensor 140) (step 316), determining, by antiskid control module 222, antiskid control valve command 228 based on wheel speed signal 232 (step 318), and outputting, by antiskid control module 222, antiskid control valve command 228 to pressure-antiskid logic 224 (step 320).

In various embodiments, step 308 may further include determining, by pressure-antiskid logic 224, if antiskid control module 222 is dominant (step 322), and outputting, by pressure-antiskid logic 224, either antiskid control valve command 228 or pressure control valve command 226 as valve command 218 based on determining whether antiskid control module 222 is dominant (step 324).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake assembly, comprising:
    a brake stack including a plurality of rotors and a plurality of stators;
    a piston assembly configured to apply a force to the brake stack, the piston assembly comprising a fluid inlet;
    a brake control valve mounted to the piston assembly and fluidly coupled to the fluid inlet of the piston assembly;
    a pressure sensor configured to measure a hydraulic pressure of the piston assembly;
    a controller electrically coupled to the brake control valve; and
    a wheel speed sensor electrically connected to the controller, wherein the controller is configured to output a valve command to the brake control valve, and wherein the controller is mounted to at least one of the piston assembly or the brake control valve, and wherein the controller comprises:
        a pressure control module configured to receive a pressure signal from the pressure sensor and a pressure command from a master brake control unit, wherein the pressure command is a digital signal and the pressure signal is an analog signal, and wherein the pressure control module outputs a pressure control valve command based on the pressure signal and the pressure command;
        an antiskid control module configured to receive an analog wheel speed signal from the wheel speed sensor and output an antiskid control valve command; and
        a pressure-antiskid logic configured to determine whether to output the pressure control valve command or the antiskid control valve command as the valve command.

2. The brake assembly of claim 1, wherein the brake control valve comprises an electrohydraulic servo valve.

3. The brake assembly of claim 2, wherein the piston assembly comprises:
    a piston housing; and
    a hydraulic piston located within the piston housing, wherein the brake control valve is mounted to the piston housing.

4. The brake assembly of claim 3, wherein the controller is configured to send a digital wheel speed data signal to the master brake control unit.

5. The brake assembly of claim 4, further comprising a tangible, non-transitory memory configured to communicate with the controller, the tangible, non-transitory memory having instructions stored thereon that, in response to execution by the controller, cause the controller to perform operations comprising:
    receiving, by the controller, the pressure command from the master brake control unit;
    determining, by the controller, to output at least one of the pressure control valve command or the antiskid control valve command as the valve command; and
    outputting, by the controller, the valve command to the brake control valve.

6. The brake assembly of claim 1, wherein the controller is mounted to the brake control valve, and wherein the brake control valve and the controller comprise a line replaceable unit.

7. A brake system for an aircraft landing gear, the brake system comprising:
    a master brake control unit configured to receive a pedal pressure command and an autobrake command and output at least one of the pedal pressure command or the autobrake command as a pressure command; and a brake assembly operationally coupled to the master brake control unit, the brake assembly comprising:
  a brake stack including a plurality of rotors and a plurality of stators;
  a piston assembly configured to apply a force to the brake stack and comprising a fluid inlet;
  a brake control valve mounted to the piston assembly and fluidly coupled to the fluid inlet of the piston assembly;
  a pressure sensor configured to measure a hydraulic pressure of the piston assembly;
  a secondary controller electrically coupled to the master brake control unit and mounted to at least one of the piston assembly or the brake control valve; and
  a wheel speed sensor electrically connected to the secondary controller, wherein the secondary controller is configured to output a valve command to the brake control valve and wherein the secondary controller comprises:
    a pressure control module configured to receive a pressure signal output by the pressure sensor and the pressure command from the master brake control unit, wherein the pressure signal is an analog signal and the pressure command is a digital signal, and wherein the pressure control module outputs a pressure control valve command based on the pressure signal and the pressure command;
    an antiskid control module configured to receive an analog wheel speed signal from the wheel speed sensor and output an antiskid control valve command; and
    a pressure-antiskid logic configured to determine whether to output the pressure control valve command or the antiskid control valve command as the valve command.

8. The brake system of claim 7, wherein the piston assembly comprises:
  a piston housing; and
  a hydraulic piston located within the piston housing, wherein the brake control valve is mounted to the piston housing.

9. The brake system of claim 8, wherein the secondary controller is mounted to the piston housing.

10. The brake system of claim 8, wherein the secondary controller is mounted to the brake control valve.

11. The brake system of claim 8, wherein the brake control valve comprises an electrohydraulic servo valve.

12. The brake system of claim 7, further comprising a first tangible, non-transitory memory configured to communicate with the master brake control unit, the first tangible, non-transitory memory having master controller instructions stored thereon that, in response to execution by the master brake control unit, cause the master brake control unit to perform master controller operations comprising:
  receiving, by the master brake control unit, the pedal pressure command and the autobrake command;
  determining, by the master brake control unit, whether an autobrake function is in an on state; and
  at least one of outputting, by the master brake control unit, the pedal pressure command to the secondary controller in response to determining the autobrake function is in an off state; or
  outputting, by the master brake control unit, the autobrake command to the secondary controller in response to determining the autobrake function is in the on state.

13. The brake system of claim 12, wherein the brake assembly further comprises a second tangible, non-transitory memory configured to communicate with the secondary controller, the second tangible, non-transitory memory having secondary controller instructions stored thereon that, in response to execution by the secondary controller, cause the secondary controller to perform secondary controller operations comprising:
  receiving, by the secondary controller, the at least one of the pedal pressure command or the autobrake command as the pressure command; and
  outputting, by the secondary controller, the valve command to the brake control valve based on the pressure command.

14. A method of controlling a brake system, comprising:
  receiving, by a secondary controller, a pressure command from a master brake control unit, wherein the pressure command is a digital signal;
  receiving, by the secondary controller, a pressure signal from a pressure sensor, wherein the pressure signal is an analog signal;
  determining, by the secondary controller, a pressure control valve command based on the pressure command from the master brake control unit and the pressure signal from the pressure sensor;
  receiving, by the secondary controller, an analog wheel speed signal from a wheel speed sensor;
  determining, by the secondary controller, an antiskid control valve command based on the analog wheel speed signal; and
  outputting, by the secondary controller, either the pressure control valve command or the antiskid control valve command as a valve command to a brake control valve of the brake system, wherein the brake control valve is mounted to a piston assembly of the brake system, and wherein the secondary controller is mounted to at least one of the piston assembly or the brake control valve.

15. The method of claim 14, wherein the brake control valve is an electrohydraulic servo valve.

16. The method of claim 15, wherein the secondary controller is mounted to the brake control valve.

17. The method of claim 14, wherein the secondary controller comprises a pressure control module and an antiskid control module, the pressure control module being configured to receive the pressure command from the master brake control unit and the pressure signal from the pressure sensor, the antiskid control module being configured to receive the wheel speed signal from the wheel speed sensor.

18. The method of claim 17, wherein outputting, by the secondary controller, the valve command comprises:
  determining, by a pressure-antiskid logic of the secondary controller, whether to output the pressure control valve command output by the pressure control module or the antiskid control valve command output by the antiskid control module as the valve command, the pressure-antiskid logic being configured to output the antiskid control valve command as the valve command in response to a skid event being identified based, at least in part, on the wheel speed signal from the wheel speed sensor.

\* \* \* \* \*